United States Patent [19]

Malyon

[11] Patent Number: 4,585,334

[45] Date of Patent: Apr. 29, 1986

[54] DOCUMENT COPIERS

[75] Inventor: Brian R. Malyon, Feltham, England

[73] Assignee: The British Library Board, London, England

[21] Appl. No.: 682,154

[22] Filed: Dec. 17, 1984

[30] Foreign Application Priority Data

Dec. 24, 1983 [GB] United Kingdom ............... 8334478

[51] Int. Cl.⁴ ............................................. G03G 15/00
[52] U.S. Cl. ..................... 355/25; 355/3 R; 355/11
[58] Field of Search ............... 355/11, 3 R, 14 R, 8, 355/24, 25

[56] References Cited

U.S. PATENT DOCUMENTS

| | | | |
|---|---|---|---|
| 2,508,650 | 5/1950 | Pratt et al. | 355/25 |
| 3,192,897 | 7/1965 | Young | 355/11 X |
| 3,319,546 | 5/1967 | Magnusson | 355/11 X |
| 3,584,947 | 6/1971 | Mihalik | 355/11 X |
| 3,712,729 | 1/1973 | O'Brien | 355/25 |
| 3,726,589 | 4/1973 | Difulvio et al. | 355/25 X |
| 4,395,118 | 7/1983 | Komori et al. | 355/25 X |
| 4,458,258 | 7/1984 | Amaya et al. | 355/3 TE X |

Primary Examiner—A. C. Prescott
Attorney, Agent, or Firm—Gifford, Groh, VanOphem, Sheridan, Sprinkle & Dolgorukov

[57] ABSTRACT

A document copier for producing photocopies from a book or equivalent bound volume, wherein a scanner housing (16) has a wedge-shaped surface with a window (18) in one face, and is mounted above a V-shaped book support (20) with provision for vertical relative movement therebetween so that a page of an open book on the book support can be located against the window. The scanner within the housing is movable to relay strip images via an optical system including reflector devices and a lens onto a photo-sensitive surface moved in synchrony with the scanner, the optical path length being kept constant (FIG. 1).

9 Claims, 6 Drawing Figures

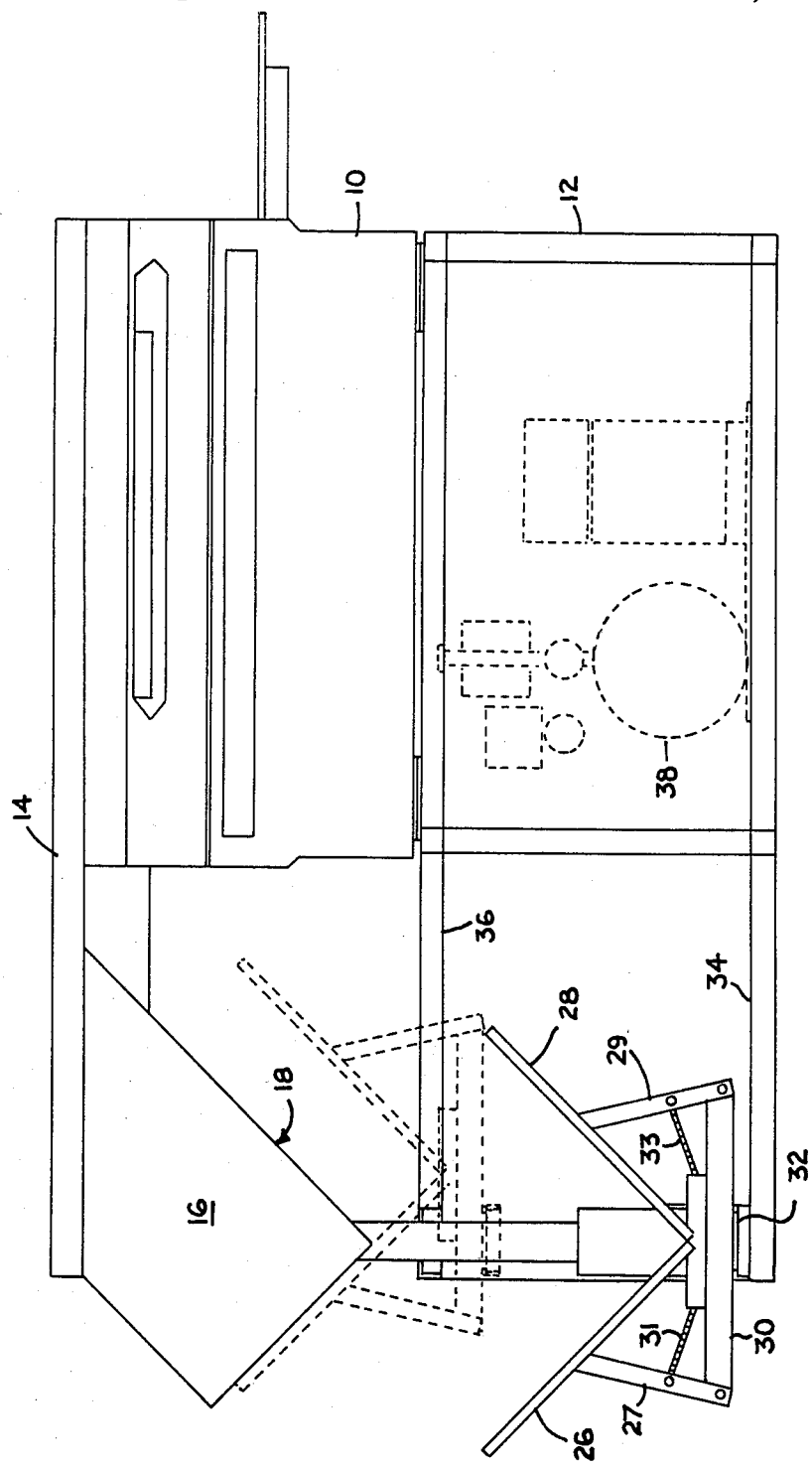

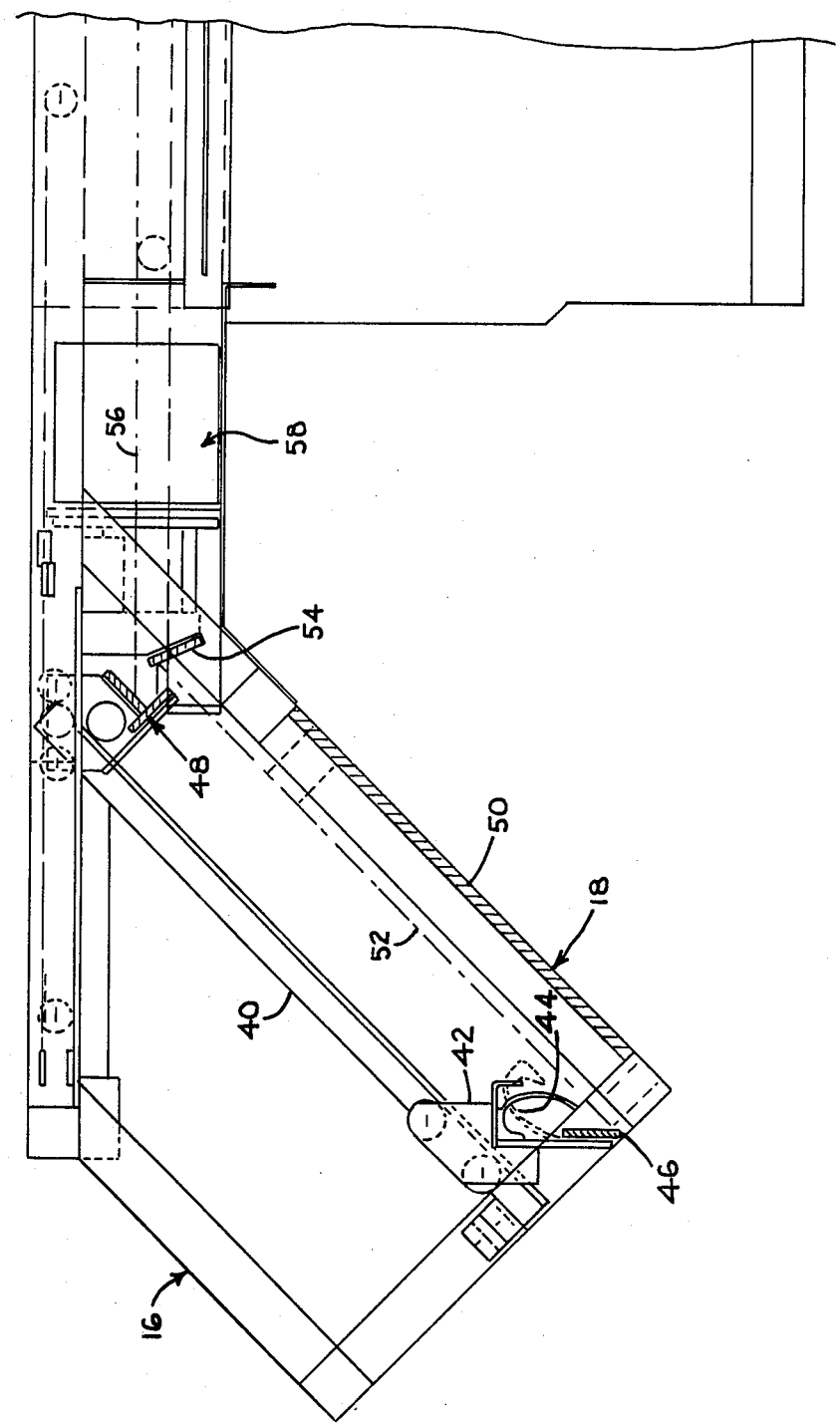

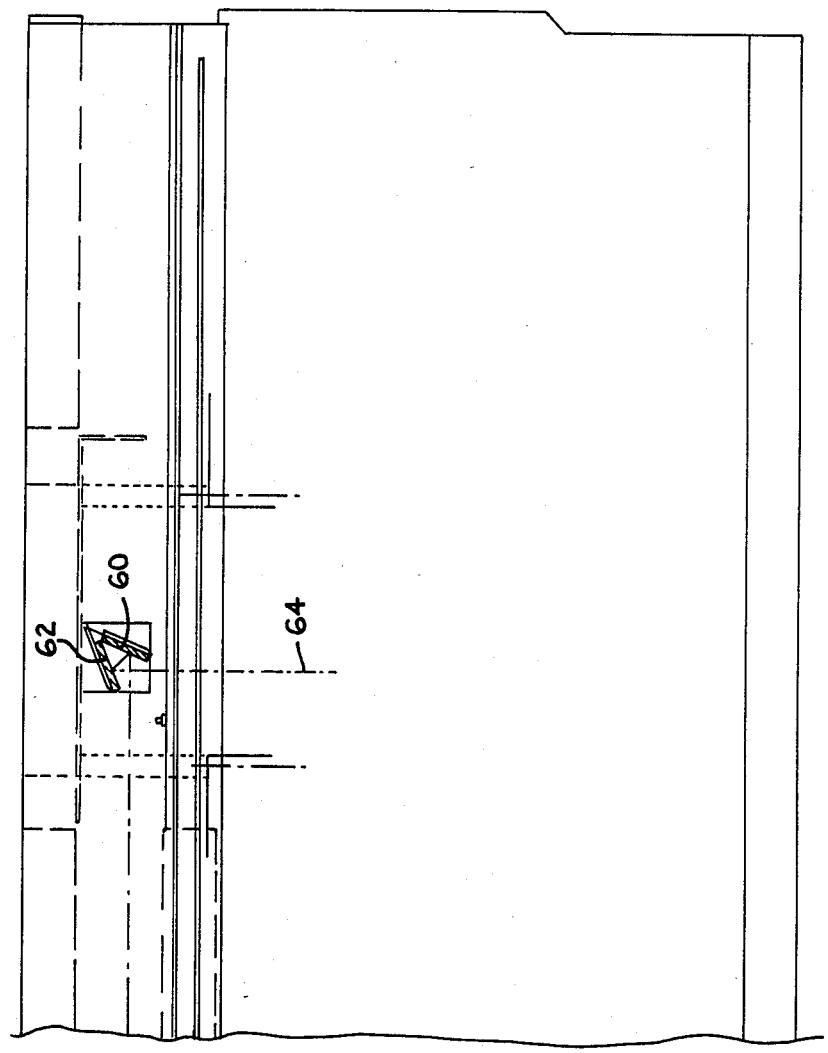

DOCUMENT COPIERS

DESCRIPTION

1. Field of Invention

This invention concerns apparatus for copying documents particularly books and providing photocopies therefrom.

2. Background to the Invention

Conventionally, photocopiers have included a flat window through which a document to be copied is scanned to produce a latent image of the document for development as a final printed copy in manner known per se.

When handling books and other bound volumes, the backing of the book is liable to be damaged as a result of the book having to be opened out flat and pressed into intimate contact with the window.

In addition, when copying from the pages of a book, conventionally the book must be upturned so that the pages are presented downfacing to the window and scanning mechanism and if a number of successive pages have to be copied, this can entail damage to the leaves of the book itself particularly if the operator is in a hurry. Furthermore, it is less easy to ascertain which page or portion of a page is going to be copied when the book is face downwards and it is an object of the present invention to provide an improved book or other bound volume document copier which obviates these problems.

SUMMARY OF THE INVENTION

According to the present invention a document copier for producing a photocopy of the page of a book comprises (1) a housing having a wedge section at least one face of which comprises a window which can be positioned against the page of the book, with the ridge of the wedge in the fold of the book;

(2) lamp means for illuminating the page positioned against the window;

(3) optical scanning means co-operating with the lamp means to produce a succession of strip images of the illuminated page;

(4) optical path means for applying the images to a photo-sensitive surface, typically in the form of a drum having a photo-sensitive external cylindrical surface;

(5) means for transferring the latent image so formed onto a sheet of paper and means for developing the electrostatic image to form the final copy, and (6) drive means for moving the lamp means and/or part of the optical path means in synchrony with means for moving the photo-sensitive device on which the optical image is formed.

In a preferred embodiment, the scanning means comprises reflector means for diverting the light from the document into the optical path, which path includes right-angled reflector means and lens means for forming an in-focus image of the illuminated document on the photo-sensitive surface within the copier, and the synchronising drive means synchronizes the movement of the scanning means relative to the right-angled reflector means so that the overall length of the optical path is maintained constant.

Where the photo-sensitive device and image-developing apparatus forms part of a conventional photocopier, the drive for the scanning means and in turn, the right-angled reflector means, preferably is derived from drive means within the photocopier.

Conveniently, the V-shaped trough is formed from two upwardly divergent plates which typically are movable apart so as to accommodate bindings of different thicknesses of binding.

Alternatively, a fixed channel may be provided between the two lowermost edges of the plates means to accommodate the spine of a book resting in the trough.

Typically, at least one of the plates is vertically movable.

The surface of each plate may in part be formed from resiliently deformable material to accommodate any unevenness in the external surfaces of a book cover.

Drive means may be provided for moving the trough up and down relative to the scanner housing or for moving the scanner housing up and down relative to the trough.

The drive means may be electric motor-operated or hydraulically operated or pneumatically operated or may be manually operated.

Where manual operation is provided, counterbalance weights and the like may be incorporated to balance out the weight of the moving part.

Conveniently, a sensing means is provided to determine when the book support and scanner housing have made contact.

According to a preferred feature of the invention, the trough or scanner housing or both are movable relative one to the other to permit rotation of the trough relative to the housing so that a book located in the trough can be rotated to present one opened page or the other to the window and the housing without the need to move the book from the trough.

Preferably, an interlock is provided to inhibit rotation of the trough unless the latter is sufficiently spaced from the wedge-shaped housing to prevent interaction between a book or the trough and the housing.

Preferably, the book support is mounted on a platform and is movable in a direction perpendicular to the lowermost edge of the wedge-shaped scanner housing to allow a book to center itself as it is offered up to the scanner housing or as the latter moves downwardly into the vee of the book.

Preferably, the optical path includes lens means for forming the latent image on the photo-sensitive device within the copier so that appropriate choice of lens power, or one-to-one copying or enlargement or reduction may be provided for. In manner known per se, differently powered lenses may be substituted to provide for reduction or enlargement or one-to-one copying within the same apparatus.

In a preferred arrangement the book-supporting trough is movable relative to a fixed wedge-shaped housing by means of a pneumatic cylinder. A compressor unit and air reservoir are provided within the apparatus to provide the necessary high-pressure air source for operating the pneumatic cylinder as and when required.

Preferably, a double-acting cylinder is employed so as to provide for powered rise and fall.

BRIEF DESCRIPTION OF THE PREFERRED EMBODIMENT

The invention will now be described by way of example with reference to the accompanying drawings in which:

FIG. 2 is a side view with hidden detail indicating different modes of operation of the copier shown in FIG. 1 and certain internal structures;

FIGS. 3A and 3B show a cross-section view through the top part of the apparatus shown in FIGS. 1 and 2, and FIGS. 4A and 4B show a top plan view of the apparatus to the same scale as FIG. 3.

DETAILED DESCRIPTION OF A PREFERRED EMBODIMENT

Figure 1:
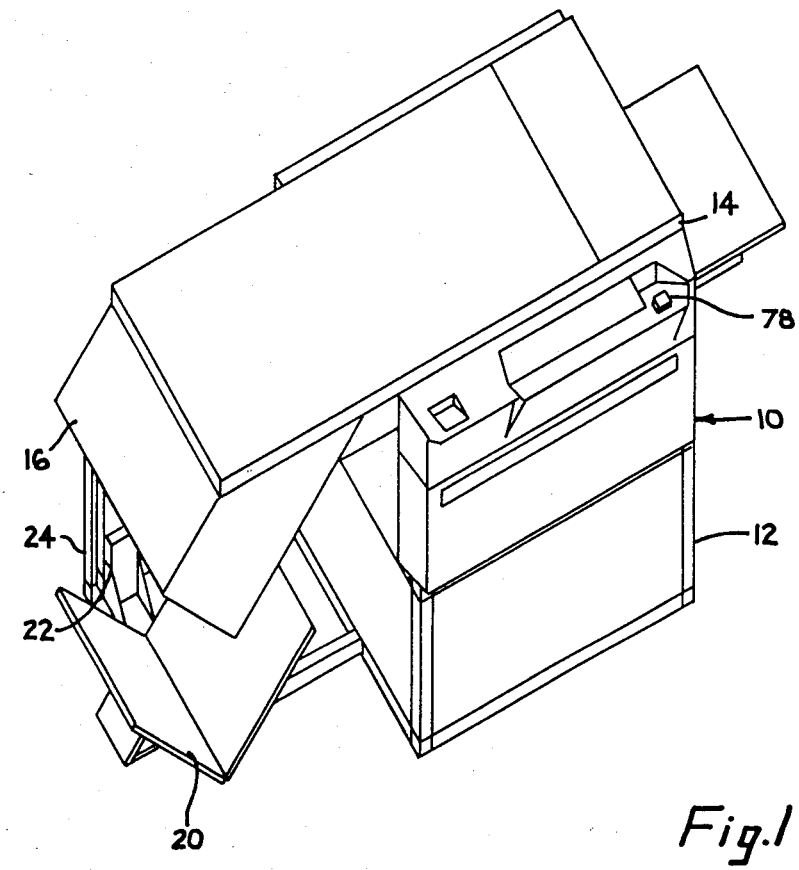
FIG. 1 is a perspective view of an apparatus for producing photocopies of pages of books or other bound volumes.

Referring to FIG. 1, a conventional moving platen photocopier apparatus generally designated 10 is mounted on a stand 12 and in place of the moving platen there is secured thereto a housing 14 which overhangs the lefthand end of the unit 10 and includes as an integral unit depending therefrom a wedge-shaped housing 16 having a window therein on the face 18 (shown in FIG. 2) for viewing the page of a book or other bound volume located on a trough 20 situated under the wedge-shaped housing 16.

The trough 20 is supported by a slidable mounting 22 which is acted on by a double-acting pneumatic cylinder located within a leg 24 (the cylinder itself not being shown) and the trough 20 can be raised or lowered relative to the wedge-shaped housing 16 so as to allow a book located thereon to be offered up to housing 16 for scanning or copying.

The wedge-shaped trough is of a design as described in a co-pending patent application and is such that the two side cheeks 26 and 28 will displace laterally and relative the one to the other so that any shape or size of book can be accommodated thereon and will automatically center itself relative to the wedge-shaped housing 16 as the book is offered up to the wedge shape. This is best seen in FIG. 2, where in dotted outline, the platform 30 on which the two inclined plates 26 and 28 are mounted is shown as having slid to the right of the supporting bracket 32 so that where a book which has been opened at basically the first page can still be accommodated and centred relative to the wedge 16 so that the open face of the book can be seen through the window 18 and will be centred relative thereto.

Although the leg assembly 24 is shown being supported by two transversely extending struts 34 and 36, advantageously the leg may be supported wholly from the upper extension of the housing 14 and if necessary the upper end of the leg assembly where it is secured to the housing 14 may be re-inforced to improve rigidity.

Below the unit 10 and within the space defined by the framework 12 is located a compressor generally designated 38 and other control apparatus. The compressor generates air pressure sufficient to operate the air cylinder (not shown) for raising and lowering the platform 30 and trough 20.

Preferably, a relief valve is provided so that as soon as the pressure in the system exceeds a given level the pressure is relieved. By careful selection of this pressure threshold, the maximum pressure between the book and the surfaces of the wedge-shaped housing 16 can be controlled so as to reduce the risk of any damage to a book occurring by excess pressure being applied.

Within the wedge-shaped housing is located a track 40 (see FIG. 3) along which a carriage assembly 40 can run. The carriage carries a lamp housing and reflector generally designated 44 and plane mirror 46. The carriage is movable from the position shown in FIG. 3 to the upper end of the track 40 and back again under the action of the drive mechanism, which itself is linked to a right-angled mirror assembly generally designated 48, so that as the carriage 42 moves in an upward direction, the right-hand mirror assembly 48 moves to the left and vice versa.

The face 18 of the wedge-shaped housing 16 includes a window 50 and light from the lamp assembly 44 is reflected back from the surface of a book (not shown) pressed against the lower surface of the window 50 and is reflected by the plane mirror 46 along the optical path shown at 52. A second plane mirror 54 is located at the upper end of the optical path shown at 52. A second plane mirror 54 is located at the upper end of the optical path 52 to divert light into the right angled reflector 48 so that the light is then diverted along the path 56, through a lens assembly generally designated 58 and finally to a further reflector assembly made up of two plane mirrors 60 and 62 which serve to divert the light through approximately 90° from the path 56 to the path 64. This path is arranged to intersect the photo-sensitive element (not shown) within the copier housing 10, typically a photo-sensitive cylindrical drum of conventional design.

The lens assembly 58 is arranged to produce an in-focus image of the elemental illuminated strip of the document surface on the surface of the drum and rotation of the drum is synchronized to movement of the carriage 42 so that successive elemental strip images of the document are positioned around the drum so as to assemble an electrostatic pattern of the document around the drum in manner known per se.

By synchronizing the movement of the right angled reflector 48 with the carriage 44, so the optical path length between the mirror 46 and the surface of the drum is maintained constant so that the image on the drum remains in focus.

Figure 4A:
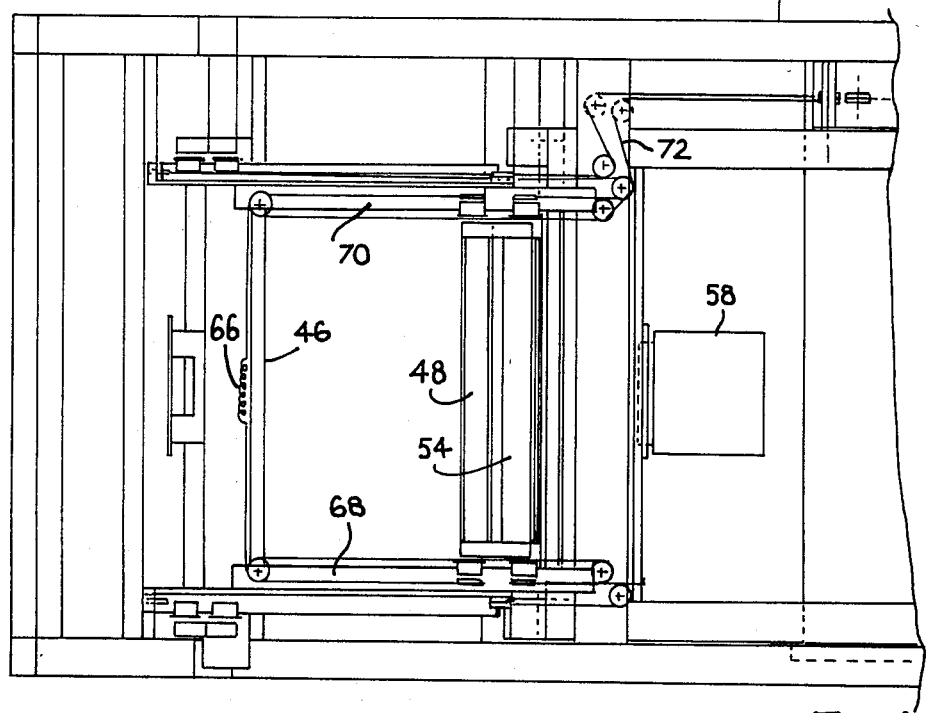
Figure 4B:
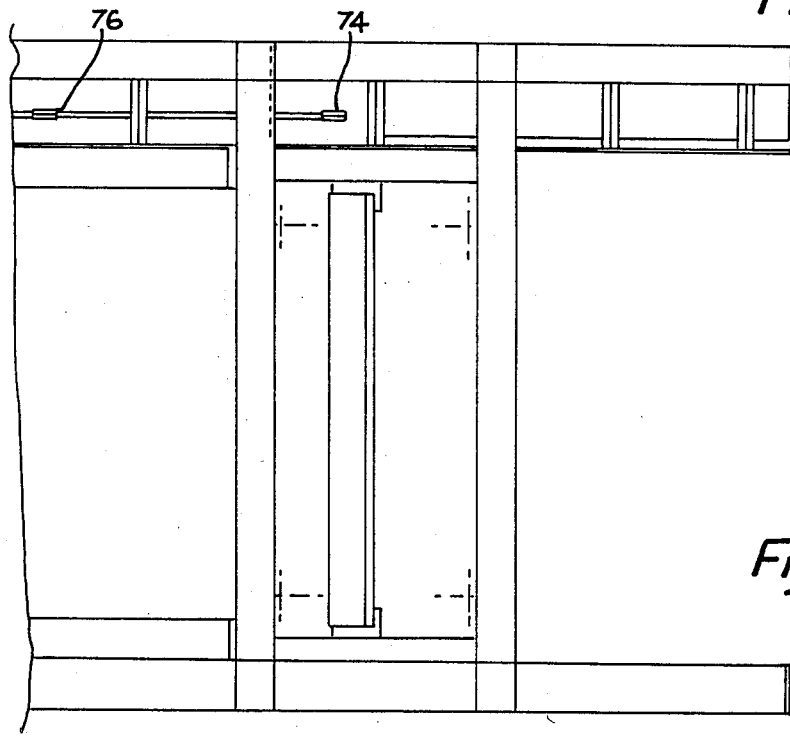

FIG. 4 shows the apparatus from a top view. A lamp is shown diagrammatically at 66. The plane mirror is visible at 46 and it will be seen that the track 40 is formed from two rails 68 and 70. The lens assembly 58 is shown mounted centrally and the reflecting mirror devices 54 and 48 are shown intermediate the lens 58 and the mirror 46.

A stranded wire drive shown at 72 communicates between the moving parts 42 and 48 and passes around various drive pulleys such as 74 and 76 and is attached in a manner (not shown) to the platen drive which is exposed when the moving platen of the copier 10 is removed. In this way, normal operation of the copier 10 by pressing the appropriate controls such as the button 78 in FIG. 1, will result in synchronised movement and operation of the lamp and reflectors within the housing 16 so as to effect appropriate scanning of the document presented to the window 50 and formation of an electrostatic image on the drum to permit a photocopy to be made in manner known per se.

Although not shown, the housing 16 may be pivotable relative to the remainder of the housing 14 so as to allow the window to be angled at different orientations and the trough 20 and leg assembly 24 may be removable from the apparatus so as to allow the housing 16 to be mounted over a table or other device for scanning documents or books or the like which cannot be accommodated in the trough 20.

If the housing 16 is capable of being rotated through more than 90°, the window can be orientated until it is vertical or even inclined to the vertical so as to present an inclined surface on which a document can be laid.

If desired, a window or viewing aperture may be provided in the housing 16 to allow a user to see the face of the document through the window 50 before it is copied. This will allow for accurate positioning of the document relative to the window 50 so that exactly the desired area of the document is either centered or actually in the field of view.

I claim:

1. A document copier for producing a photocopy from a book having plural edge-connected pages, comprising:
    a housing having a wedge section at least one face of which comprises a window which can be positioned against one of the pages of the book, with the ridge of the wedge in the fold of the book;
    lamp means for illuminating the page positioned against the window;
    optical scanning means co-operating with the lamp means to produce a succession of strip images of the illuminated page;
    optical path means for applying the strip images to a photo-sensitive surface;
    means for moving the photo-sensitive surface for assembly of the strip images thereon;
    means for transferring the composite latent image so formed on to a sheet of paper and means for developing the resulting electrostatic image to form a final copy;
    device means for moving at least one of the lamp means and part of the optical path means synchronously with means for moving the photo-sensitive surface to which the strip images are applied; and
    a V-shaped book support for supporting a book beneath the wedge section housing, said book support comprising two upwardly divergent plates which are movably adjustable in horizontal spacing.

2. A copier according to claim 1, wherein the photo-sensitive surface is formed by a drum having a photo-sensitive external cylindrical surface, the surface moving means comprises means for relating the drum, and the drive means for the lamp means and part of the optical path means operates in synchrony with the means for rotating the drum.

3. A copier according to claim 1, wherein the scanning means comprises reflector means for diverting the light from the page into the optical path means, which path means includes a reflector device and lens means for forming an in-focus image of the illuminated page on the photo-sensitive surface, and the movement of the scanning means is synchronised with movement of the reflector device so that the overall length of the optical path is maintained constant.

4. A copier according to claim 3, wherein the drive for the scanning means and, in turn, the drive for the reflector device, is derived from a main drive within the photocopier which effects paper transport and movement of the photo-sensitive surface.

5. A copier according to claim 1, wherein the two divergent plates are bridged by a channel at the bottom apex, and at least one of the plates is movably adjustable in the vertical direction.

6. A copier according to claim 5, wherein each plate has a book supporting surface formed by resiliently deformable material.

7. A copier according to claim 1, including positioning means for effecting relative vertical movement of the book support and the wedge section housing, and a sensor for determining when a book on the book support is in operative contact with the housing.

8. A copier according to claim 1, including mounting means enabling a relative rotational movement of the housing and the book support at least sufficiently to enable either page of an open book to be positioned against the housing window without re-positioning of the book on the book support, and interlock means for inhibiting relative rotational movement of the housing and the book support unless said parts are sufficiently spaced in the vertical direction to prevent their engagement as a result of said relative rotational movement.

9. A copier according to claim 7, wherein the book support is mounted on a platform vertically movable relative thereto in a direction normal to the line of the apex of the wedge-shaped housing to enable self-centering as a book on the support is offered into engagement with the relatively movable platform and housing.

* * * * *